United States Patent [19]

Kakinuma et al.

[11] Patent Number: 5,006,702
[45] Date of Patent: Apr. 9, 1991

[54] SCANNING CIRCUIT DEVICE WITH SAWTOOTH VOLTAGE SOURCE

[75] Inventors: Hiromi Kakinuma; Hideo Iida, both of Takasaki, Japan

[73] Assignee: Taiyo Yuden Co., Ltd., Tokyo, Japan

[21] Appl. No.: 474,774

[22] PCT Filed: Jul. 28, 1989

[86] PCT No.: PCT/JP89/00782

§ 371 Date: Mar. 12, 1990

§ 102(e) Date: Mar. 12, 1990

[87] PCT Pub. No.: WO90/01846

PCT Pub. Date: Feb. 22, 1990

[30] Foreign Application Priority Data

Jul. 30, 1988 [JP] Japan .................. 63-190848

[51] Int. Cl.$^5$ .............................. H01J 40/14
[52] U.S. Cl. .................. 250/208.1; 250/208.3
[58] Field of Search .......... 250/208.1, 208.2, 208.3, 250/211 J, 211 R; 358/213.11, 213.12, 213.22, 212; 307/228, 311

[56] References Cited

U.S. PATENT DOCUMENTS

| | | | |
|---|---|---|---|
| 3,344,278 | 9/1967 | Yanai | 250/211 J |
| 3,400,272 | 9/1968 | Dym et al. | 250/211 J |
| 3,418,652 | 12/1968 | Brooks | 250/208.3 |
| 3,432,670 | 3/1969 | Dym | 250/208.3 |
| 3,448,275 | 6/1969 | Hall | 250/208.3 |
| 3,452,205 | 6/1969 | Bogholtz, Jr. et al. | 250/211 J |
| 3,480,830 | 11/1969 | Horton et al. | 250/211 J |
| 4,785,191 | 11/1988 | Ondris | 250/211 J |

OTHER PUBLICATIONS

Japanese Unexamined Patent Pub. No. 63-2377, Hatanaka et al., Jan. 7, 1988.
Japanese Unexamined Patent Pub. No. 61-203771, Nakayama et al., Sep. 9, 1986.
Japanese Patent Pub. No. 43-30205, Ando, Dec. 25, 1968.
Japanese Patent Publication No. 47-9050, Netsu, Mar. 16, 1972.
Japanese Unexamined Patent Publication No. 58-177074, Yamamura et al, Oct. 17, 1983.

Primary Examiner—David C. Nelms
Assistant Examiner—Michael Messinger
Attorney, Agent, or Firm—Woodcock Washburn Kurtz Mackiewicz & Norris

[57] ABSTRACT

A scanning circuit device for providing analog switching action for a one dimensional image sensor, comprising a voltage source (1) for providing a sawtooth wave, a first ($Da_1$–$Da_3$) and a second ($Db_1$–$Db_3$) group of diodes, and a first ($Ra_1$–$Ra_3$) and a second ($Rb_1$–$Rb_3$) group of resistors. The two groups of diodes become sequentially conductive in response to the sawtooth wave, with the result that a set of circuit elements ($S_1$–$S_3$) connected in parallel with the second group of diodes are sequentially scanned electrically. The diodes used as analog switches are easier to fabricate than transistors.

9 Claims, 8 Drawing Sheets

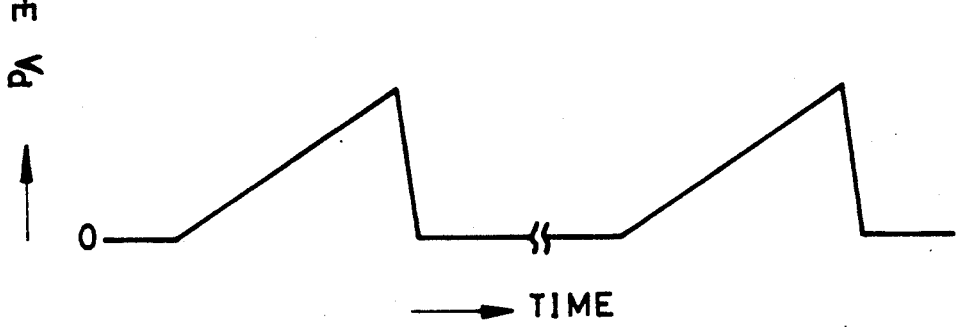
FIG. 2
FIG. 3
FIG. 4
FIG. 5
FIG. 7
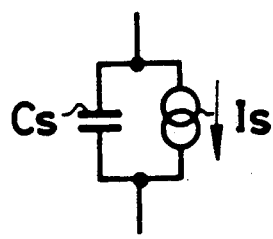
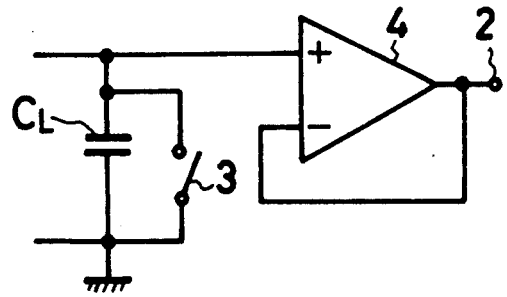

SCANNING CIRCUIT DEVICE WITH SAWTOOTH VOLTAGE SOURCE

TECHNICAL FIELD

The present invention relates to a scanning circuit for successively delivering voltages to a set of circuit elements, and more specifically to a scanning circuit suitable for use in a one-dimensional image sensor.

BACKGROUND ART

The image scanner has been known which comprises photoelectric converters for translating optical information into electric signals, and analog switches for electrically scanning the photoelectric converters to selectively obtain the electric signals. The analog switches may take the form of field-effect transistors (FETs) disposed adjacent the photoelectric converters, as taught by Japanese Unexamined Patent No. 63-2377 laid open to public inspection on Jan. 7, 1988.

In an image sensor fabricated in the form of an integrated circuit, each FET must be sized to fit the width (e.g. 125 micrometers) of one photoelectric converter, that is, of one picture element. However, it is no easy task to form the FETs of that size. The difficulty increases as the three wiring conductors of minimum widths for the drain, source and gate of each FET must be formed on prescribed narrow parts of the baseplate.

The present invention aims at the provision of a scanning circuit utilizing diodes which have a smaller number of electrodes than transistors.

DISCLOSURE OF INVENTION

The scanning circuit of this invention comprises a voltage source for generating a sawtooth wave as a scanning or sweep voltage; a first series circuit having a plurality of diodes interconnected in series and each having a first and a second electrode, the first series circuit being connected to a first terminal of the voltage source; a plurality of second series circuits each having a resistor and a diode interconnected in series, the second series circuit being connected one between the second electrode (e.g. cathode) of each diode of the first series circuit and a second terminal of the voltage source; a plurality of resistors connected one between the second electrode of each diode of the first series circuit and the second terminal of the voltage source; and a plurality of scanned circuit elements connected substantially in parallel with the respective diodes of the second series circuits. The diodes of the first and second series circuits are all so oriented as to be forward biased by the sawtooth wave. As the sawtooth wave is supplied to the first and second series circuits from the voltage source, the diodes included in these circuits become sequentially conductive, with the result that the circuit elements are successively scanned electrically.

BRIEF DESCRIPTION OF DRAWINGS

FIG. 2 is a waveform diagram of the sawtooth wave generated by the voltage source of FIG. 1.

FIGS. 3 and 4 are waveform diagrams of alternate sawtooth waves to be generated by the voltage source.

FIG. 5 is a schematic electrical diagram of a circuit equivalent to each photoelectric converter of FIG. 1.

FIG. 7 is a schematic electrical diagram of a modified circuit for deriving an output voltage from the photoelectric converters.

BEST MODE FOR CARRYING OUT THE INVENTION

Figure 1:
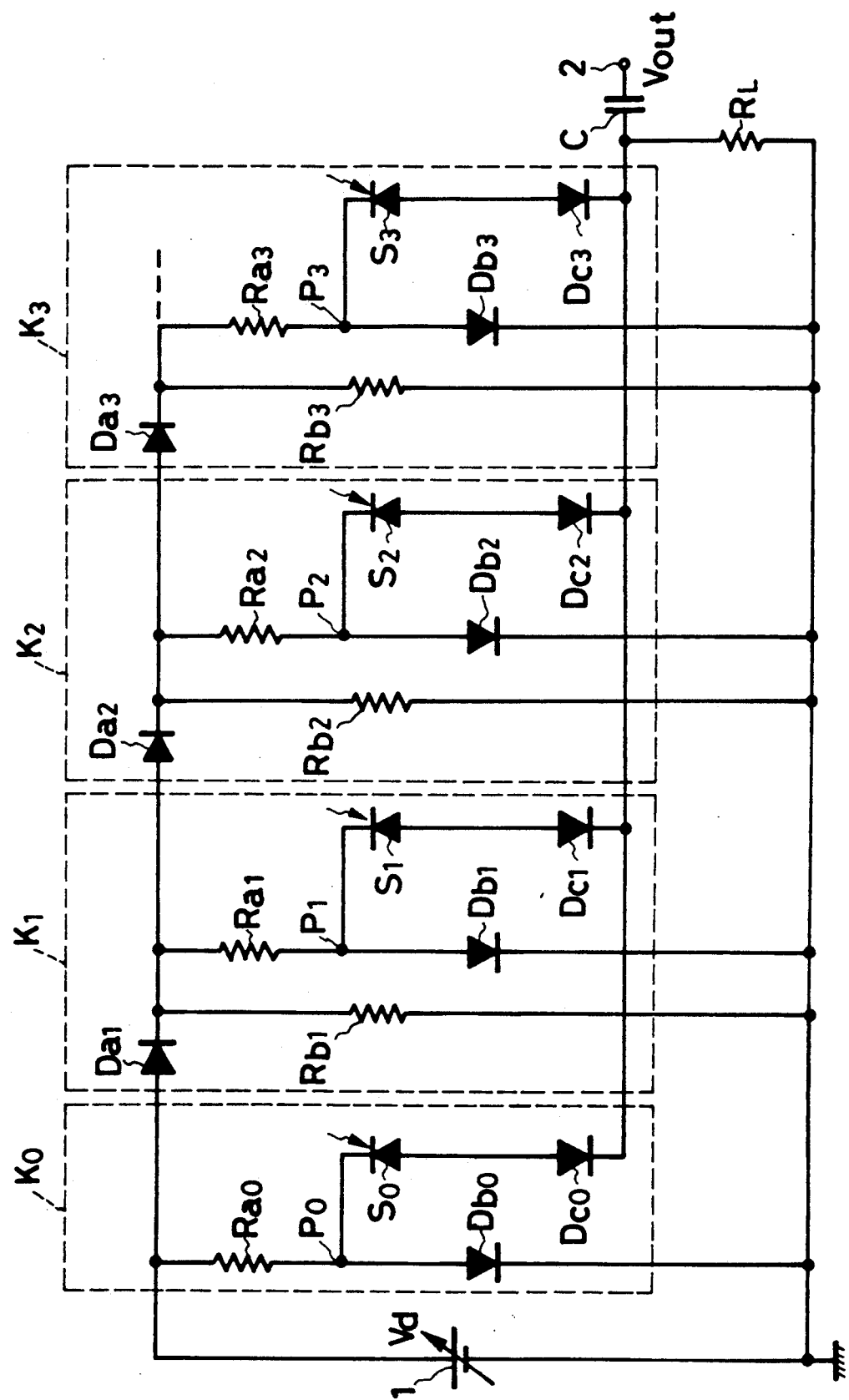
FIG. 1 is a schematic electrical diagram of an image sensor embodying the principles of the present invention.

As illustrated in FIG. 1, the one dimensional image sensor in accordance with the invention comprises a voltage source 1, four unit circuits $K_0$, $K_1$, $K_2$ and $K_3$ corresponding to four picture elements or bits, a load resistor $R_L$, a coupling capacitor C, and an output terminal 2. This image sensor is constructed to detect four or more picture elements. However, only part of the image sensor is illustrated in FIG. 1 because it is difficult to show its complete construction.

The three unit $K_1$, $K_2$ and $K_3$ are identical in construction, comprising a first group of diodes $Da_1$, $Da_2$ and $Da_3$, a second group of diodes $Db_1$, $Db_2$ and $Db_3$, a first group of resistors $Ra_1$, $Ra_2$ and $Ra_3$, a second group of resistors $Rb_1$, $Rb_2$ and $Rb_3$, photoelectric converters $S_1$, $S_2$ and $S_3$, and blocking diodes $Dc_1$, $Dc_2$ and $Dc_3$.

Connected between voltage source 1 and unit circuit $K_1$, the additional unit circuit $K_0$ comprises a diode $Db_0$, a resistor $Ra_0$, a photoelectric converter $S_0$, and a blocking diode $Dc_0$. The unit circuit $K_0$ does not have circuit elements corresponding to the diodes $Da_1$, $Da_2$ and $Da_3$ and resistors $Rb_1$, $Rb_2$ and $Rb_3$ of the other unit circuits $K_1$, $K_2$ and $K_3$. However, the unit circuit $K_0$ could also be constructed to include these circuit elements. Also, the image sensor of FIG. 1 could dispense with this unit circuit $K_0$.

The first serial circuit of the diodes $Da_1$, $Da_2$ and $Da_3$, each having an anode (first electrode) and a cathode (second electrode), is connected at one end to one end of the voltage source 1. These diodes $Da_1$, $Da_2$ and $Da_3$ are so oriented as to be forward biased by the voltage source 1, that is, the anodes (first electrodes) of these diodes are oriented toward the voltage source 1. The cathodes of the diodes $Da_1$–$Da_3$ may be oriented toward the voltage source 1 if the upper terminal of the voltage source is negative.

Connected respectively between the cathodes (second electrodes) of the first group of diodes $Da_1$–$Da_3$ and the other end (ground) of the voltage source 1 are the circuits (second serial circuits) of the first group of resistors $Ra_1$–$Ra_3$ and second group of diodes $Db_1$–$Db_3$ interconnected respectively in series. In the unit circuit $K_0$ the serial circuit of resistor $Ra_0$ and diode $Db_0$ is connected between the opposite ends of the voltage source 1. The second group of diodes $Db_0$–$Db_3$ are so oriented as to be forward biased by the voltage source 1.

The cathodes of the photoelectric converters $S_0$–$S_3$ are connected to the points $P_0$–$P_3$ of connection between resistors $Ra_0$–$Ra_3$ and diodes $Db_0$–$Db_3$ in the unit circuits $K_0$–$K_3$. The anodes of the photoelectric converters $S_0$–$S_3$ are connected to the other end (ground) of the voltage source 1 via the respective blocking diodes $Dc_0$–$Dc_3$ and the common load resistor $R_L$. The blocking diodes $Dc_0$–$Dc_3$ are intended to prevent mutual interferences of the photoelectric converters $S_0$–$S_3$. Therefore, the photoelectric converters $S_0$–$S_3$ are substantially in parallel connection with the diodes $Db_0$–$Db_3$, respectively. Constituted of photodiodes, the photoelectric converters $S_0$–$S_3$ are so oriented as to be reverse biased by the voltage source 1. The current flowing through these photoelectric converters are of extremely small magnitude.

The following is a more detailed discussion of the image sensor of FIG. 1.

The voltage source 1 is comprised of a circuit for generating a sawtooth sweep signal shown in FIG. 2. The sawtooth wave of FIG. 2 has its peak amplitude so determined as to be sufficient to turn on all of the first and second groups of diodes $Da_1$–$Da_3$ and $Db_0$–$Db_3$.

The sawtooth wave of FIG. 2, having ramp portions linearly increasing in magnitude with time, may be replaced by the sawtooth wave of FIG. 3, having ramp portions increasing by increments, or by that of FIG. 4, having ramp portions increasing nonlinearly with time.

The photoelectric converters $S_0$–$S_3$, first group of diodes $Da_1$–$Da_3$, second group of diodes $Db_0$–$Db_3$ and blocking diodes $Dc_0$–$Dc_3$ are all pin junction diodes, each comprising a semiconductor layer of amorphous silicon hydride sandwiched between a pair of electrodes, all formed on a common insulating baseplate.

Being reverse biased, the photoelectric converters $S_0$–$S_3$ are shown in FIG. 5 as a parallel connection of a capacitor Cs and a source Is of a current that is proportional in magnitude with the intensity of incident light. The current flowing through the equivalent capacitance Cs of the photoelectric converters $S_0$–$S_3$ is of minimal magnitude.

The forward voltage Vf when the diodes $Da_1$–$Da_3$ and $Db_0$–$Db_3$ are conductive is approximately one volt. The first group of resistors $Ra_0$–$Ra_3$ have each a resistance of 1 kilohm whereas the second group of resistors $Rb_1$–$Rb_3$ have each a resistance of 100 kilohms. These resistances are fabricated from $TiO_2$, Ta-$SiO_2$, NiCr, etc. The voltage source 1 comprising a sawtooth sweep signal generator circuit takes the form of an integrated circuit. The coupling capacitor C and load resistor RL form discrete units.

Figure 6:
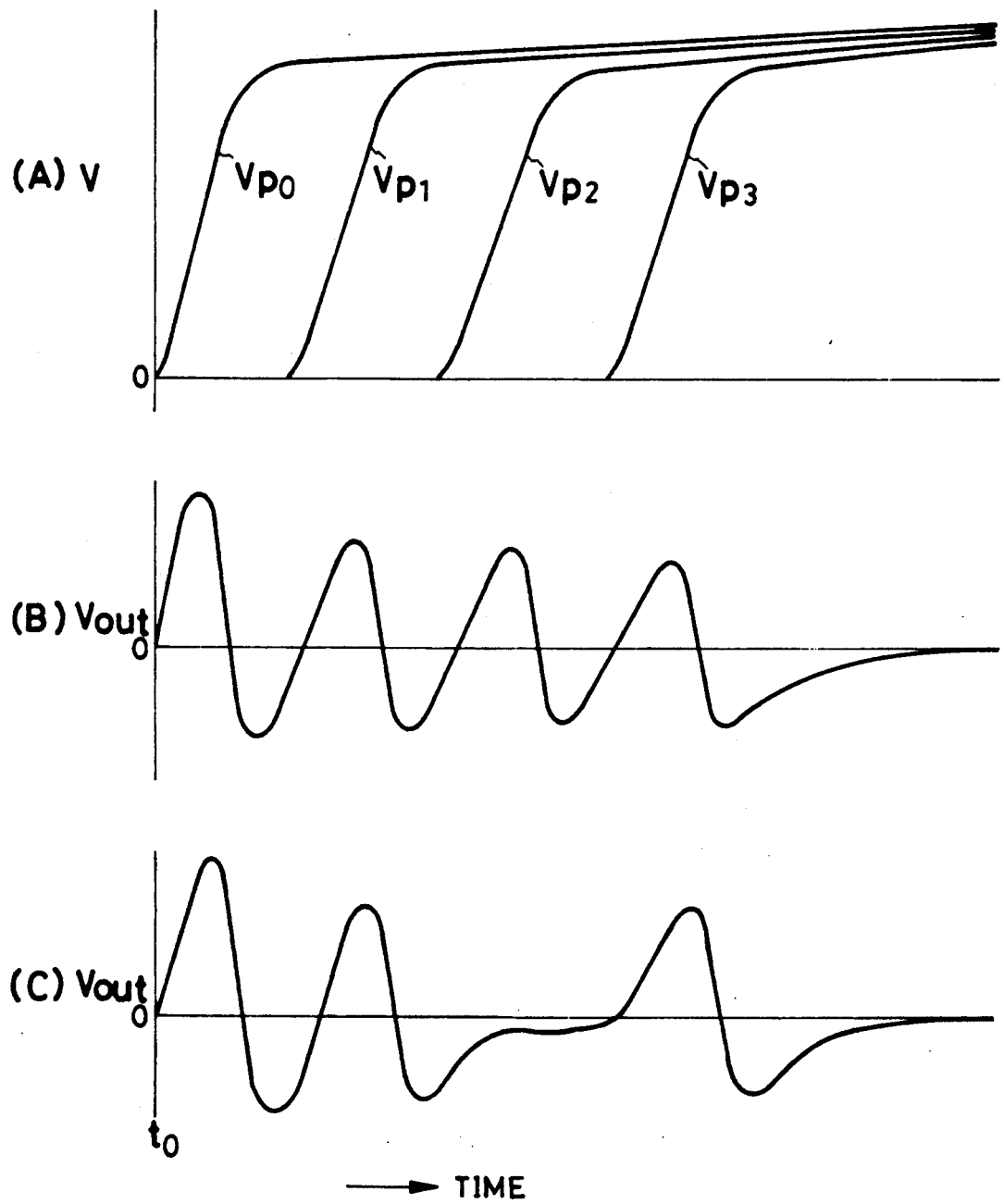
FIG. 6, consisting of (A)-(C), is a waveform diagram showing the waveforms of voltages appearing in the image sensor of FIG. 1, (A) showing potentials at the points of connection of the four photoelectric converters, (B) showing the output voltage when optical inputs are supplied to all the photoelectric converters, and (C) showing the output voltage when optical inputs are supplied to all but one of the photoelectric converters.

Such being the construction of the image sensor shown in FIG. 1, the first group of diodes $Da_1$–$Da_3$ become sequentially conductive as the voltage source 1 generates the sawtooth wave of FIG. 2. First, the potential $Vp_0$ of the point $P_0$ gradually increases as shown in FIG. 6(A) with an increase in the ramp portion of the sawtooth wave. The diode $Db_0$ of the unit circuit $K_0$ becomes conductive when the potential $Vp_0$ rises to the forward voltage Vf of the diode $Db_0$ of the unit circuit $K_0$, with the result that the potential $Vp_0$ becomes saturated and levels off at approximately Vf.

The diode $Da_1$ of the unit circuit $K_1$ becomes conductive approximately at the same time with the conduction of the diode $Db_0$ of the unit circuit $K_0$. The cathode of the diode $Da_1$ has been at approximately zero volt during the nonconducting period of the diode $Da_1$. However, this cathode voltage rises with the supply voltage Vd upon conduction of the diode $Da_1$. That is because the voltage across the diode $Da_1$ on conduction becomes fixed at approximately the forward voltage Vf, so that a voltage equal to the difference between the supply voltage Vd and the forward voltage Vf of the diode $Da_1$ is impressed across the resistor $Rb_1$. Also, the potential of the point $P_1$ of the unit circuit $K_1$ is approximately equal to the voltage across the resistor $Rb_1$ during the nonconducting period of the diode $Db_1$ of the unit circuit $K_1$. Consequently, the potential $Vp_1$ of the circuit point $P_1$ gradually increases as shown in FIG. 6(A) following the conduction of the diode $Da_1$. The potential $Vp_1$ levels off at approximately Vf upon conduction of the diode $Db_1$ when the potential $Vp_1$ equals its forward voltage Vf.

The diode $Da_2$ of the unit circuit $K_2$ becomes conductive approximately at the same time with the conduction of the diode $Db_1$ of the unit circuit $K_1$. A potential develops at the point $P_2$ of the unit circuit $K_2$ as shown at $Vp_2$ in FIG. 6(A).

The diode $Da_3$ of the unit circuit $K_3$ becomes conductive with a further increase in the ramp portion of the sawtooth voltage from the source 1. A potential develops at the point $P_3$ of the unit circuit $K_3$ as shown at $Vp_3$ in FIG. 6(A).

Thus, as the potentials $Vp_0$–$Vp_3$ at the circuit points $P_0$–$P_3$ successively varies as plotted in FIG. 6(A), the photoelectric converters $S_0$–$S_3$ connected between these circuit points and the ground via the resistor RL are driven successively. In other words, the photoelectric converters are scanned electrically.

The photoelectric converters $S_0$–$S_3$ are disposed one dimensionally in the circuit of FIG. 1. The voltage source 1 must generate a sufficiently high voltage for causing conduction through all of the diodes $Da_1$–$Da_3$ and $Db_0$–$Db_3$ in order to obtain optical information from the photoelectric converters $S_0$–$S_3$. The voltage required for the conduction of all these diodes can be provided by the sawtooth voltage of FIG. 2, for the peak and neighboring values of the sawtooth voltage are sufficiently high for that purpose.

The photoelectric converters $S_0$–$S_3$ are reverse biased by the forward voltages Vf of the diodes $Db_0$–$Db_3$, obtained at the circuit points $P_0$–$P_3$, during the conduction of all of the diodes $Da_1$–$Da_3$ and $Db_0$–$Db_3$, resulting in the charging of the equivalent capacitors such as shown at Cs in FIG. 5. The equivalent capacitors Cs are of so small capacitance that their charging can be completed before the steep rise of the forward current of the blocking diodes $Dc_0$–$Dc_3$.

When the photoelectric converters $S_0$–$S_3$ input optical signals from a subject copy (not shown) such as a facsimile manuscript placed opposite the image sensor of FIG. 1, the charges on the equivalent capacitors Cs of the photoelectric converters $S_0$–$S_3$ change depending upon the presence or absence of the optical signals or on their relative magnitudes. Discharge takes place in those of the photoelectric converters $S_0$–$S_3$ which have received the optical signals, and not in the other converters which have received no optical signals. The amounts of discharge are proportional to the intensities of the incident light.

There are two methods of supplying optical inputs to the photoelectric converters $S_0$–$S_3$. One is to constantly supply optical inputs to them. The other is to give optical inputs only during predetermined times, for example, when the supply voltage Vd is zero.

The photoelectric converters $S_0$–$S_3$ are sequentially reverse biased by the potentials $V_{p0}$–$V_{p3}$ developing at the circuit points $P_0$–$P_3$ as the supply voltage Vd linearly increases with time as shown in FIG. 2. That is to say that the voltages for charging the equivalent capacitors Cs are impressed to the photoelectric converters $S_0$–$S_3$. At this time the charging current flows only into those of the equivalent capacitors Cs of the photoelectric converters $S_0$–$S_3$ which have discharged in response to the optical inputs, but not into the others which have not discharged because of the absence of optical inputs. The charging current flows through the blocking diodes $D_{c0}$–$D_{c3}$ and load resistor RL, so that the voltage of the load resistor RL is subject to change depending upon the presence or absence of the charging current. The output voltage Vout changes correspondingly.

The forward voltage Vf of the diodes $D_{b0}$–$D_{b3}$ does not become completely saturated (constant) but increases with an increase in the ramp voltage, so that the voltage of the load resistor RL also increases with an increase in the ramp voltage. However, the output voltage Vout representative of the optical inputs to the photoelectric converters $S_0$–$S_3$ can be obtained by deriving the alternating current component of the voltage across the load resistor RL by the coupling capacitor C.

As shown in FIG. 6(B), the output voltage Vout changes each time the charging current flows to the photoelectric converters $S_0$–$S_3$ when the potentials $V_{p0}$–$V_{p3}$ of FIG. 6(A) are successively impressed to the photoelectric converters while the equivalent capacitors Cs are discharged as a result of the supply of optical inputs to all of the four photoelectric converters. The charging current for the equivalent capacitors Cs increases with an increase in the potentials $V_{p0}$–$V_{p0}$ of the circuit points $P_0$–$P_3$, and decreases upon saturation of the potentials $V_{p0}$–$V_{p3}$. The output voltage Vout varies in magnitude with the change of the charging current.

FIG. 6(C) shows the output voltage Vout when only the photoelectric converters $S_0$, $S_1$ and $S_3$ have received optical inputs. In this case, no charging current flows to the photoelectric converter $S_2$ when the potentials $V_{p0}$–$V_{p3}$ of FIG. 6(A) are sequentially applied to the photoelectric converters $S_0$–$S_3$. Consequently, the output voltage Vout does not include a change corresponding to the potential $V_{p2}$ of FIG. 6(A).

The charging currents of the photoelectric converters $S_0$–$S_3$ are also readable by the circuit of FIG. 7. In this circuit a capacitor CL is connected in place of the load resistor RL of the FIG. 1 circuit, so that the photoelectric converters are charged through this capacitor CL. The charge on the capacitor CL corresponds to the charging current of the photoelectric converters $S_0$–$S_3$. Connected in parallel with the capacitor CL, a switch 3 is periodically turned on in synchronism with the scanning of the photoelectric converters $S_0$–$S_3$. Therefore, periodically discharged, the capacitor CL provides a voltage corresponding to the charging currents of the photoelectric converters $S_0$–$S_3$. The voltage of the capacitor CL is supplied to the output terminal 2 via an operational amplifier 4.

Figure 8:
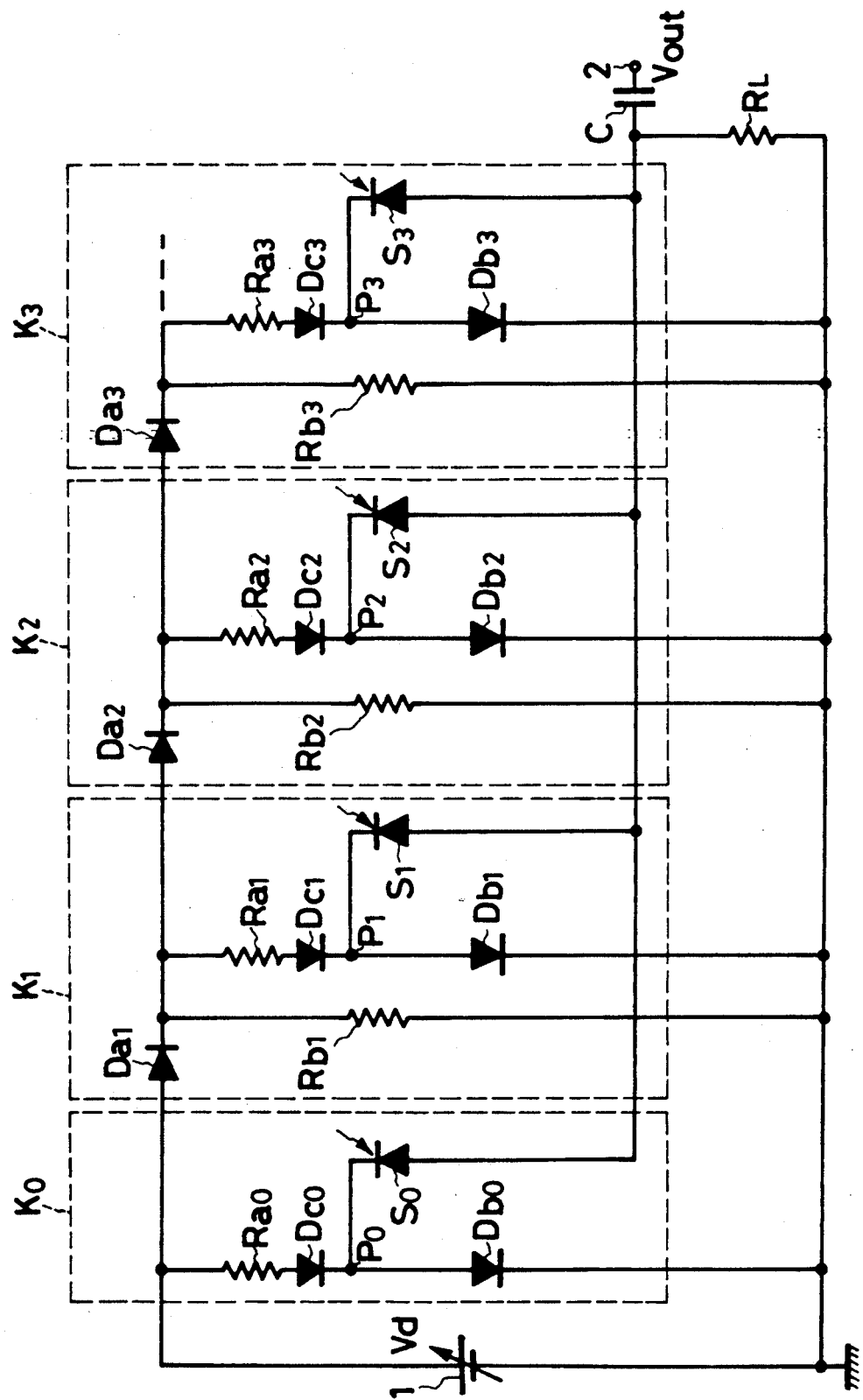
FIGS. 8 and 9 are schematic electrical diagrams of modified image sensors in which the blocking diodes are connected in positions different from those in the image sensor of FIG. 1.
Figure 9:
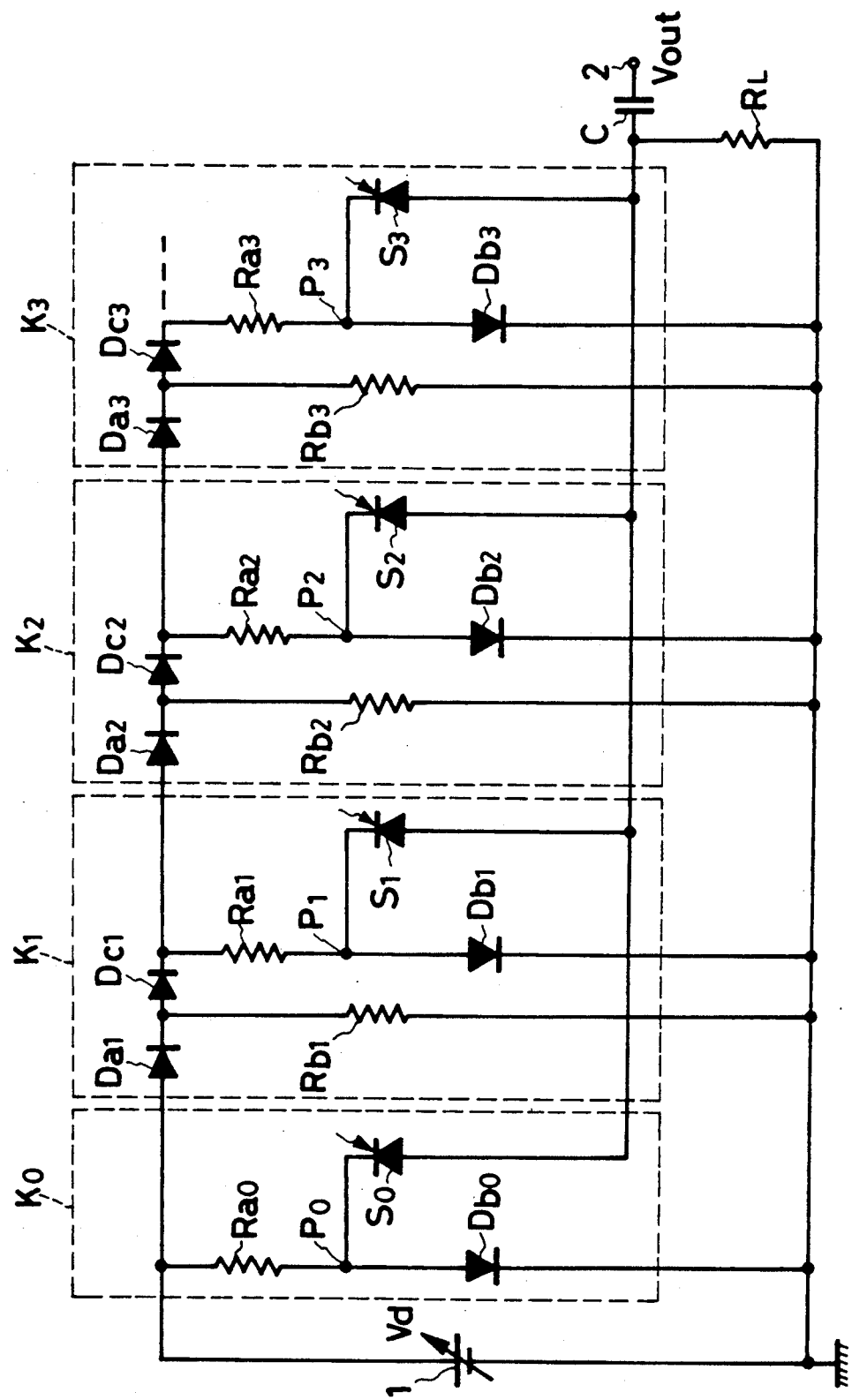
Figure 10:
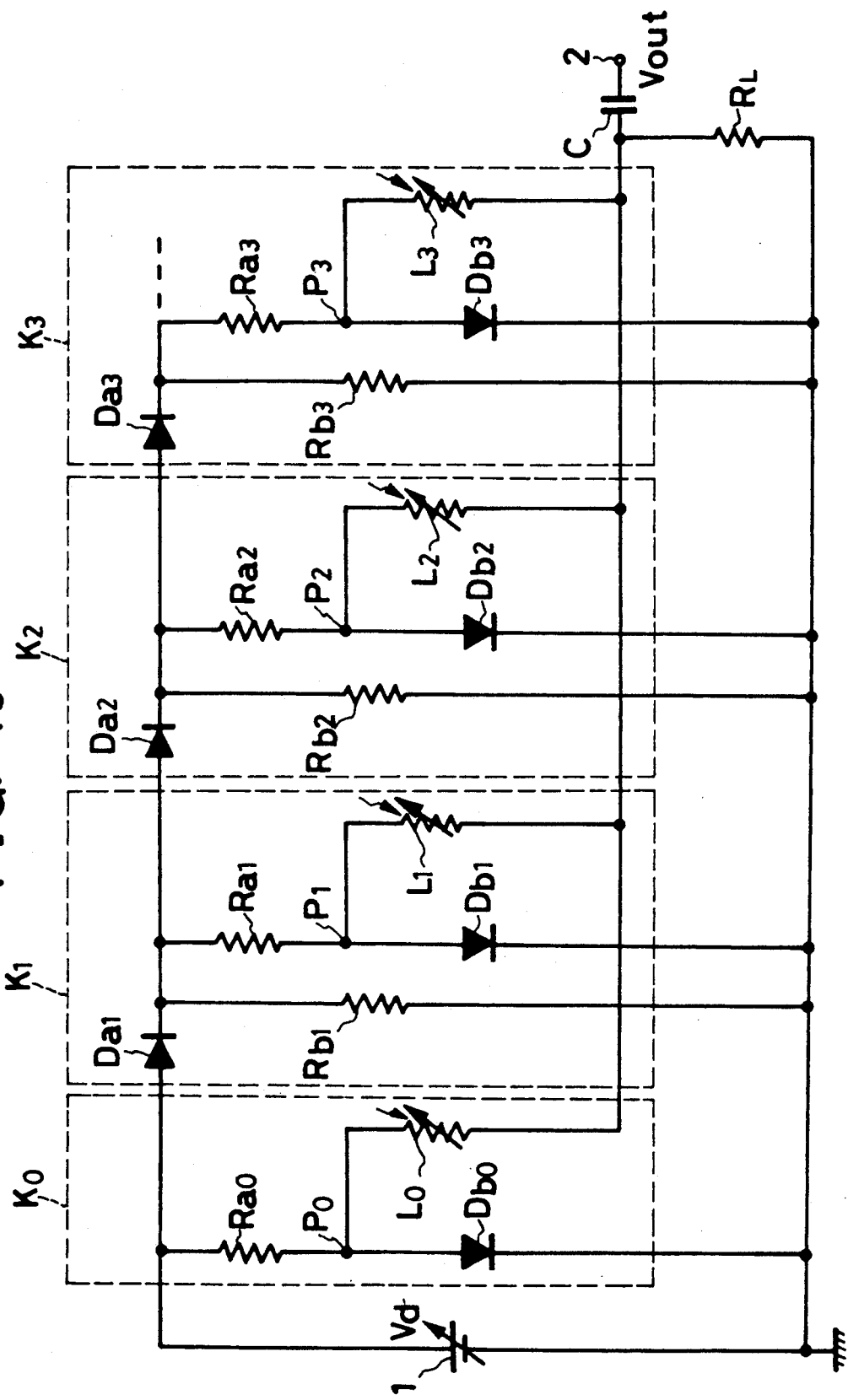
FIG. 10 is a schematic electrical diagram of a modified circuit having photoelectric converters different from those used in the circuit of FIG. 1.

The blocking diodes $D_{c0}$–$D_{c3}$ of the FIG. 1 circuit may be connected in positions other than those of FIG. 1. The blocking diodes $D_{c0}$–$D_{c3}$ are connected in series with the resistors $R_{a0}$–$R_{a3}$, respectively, in FIG. 8. The blocking diodes $D_{c1}$–$D_{c3}$ are connected between resistors $R_{a1}$–$R_{a3}$ and resistors $R_{b1}$–$R_{b3}$ in FIG. 9. The blocking diodes $D_{c0}$–$D_{c3}$ are totally absent in the circuit of FIG. 10. Also, in this alternative circuit, the photoelectric converters are shown as photoconductive elements $L_0$–$L_3$ which vary in resistivity with input radiation.

Figure 11:
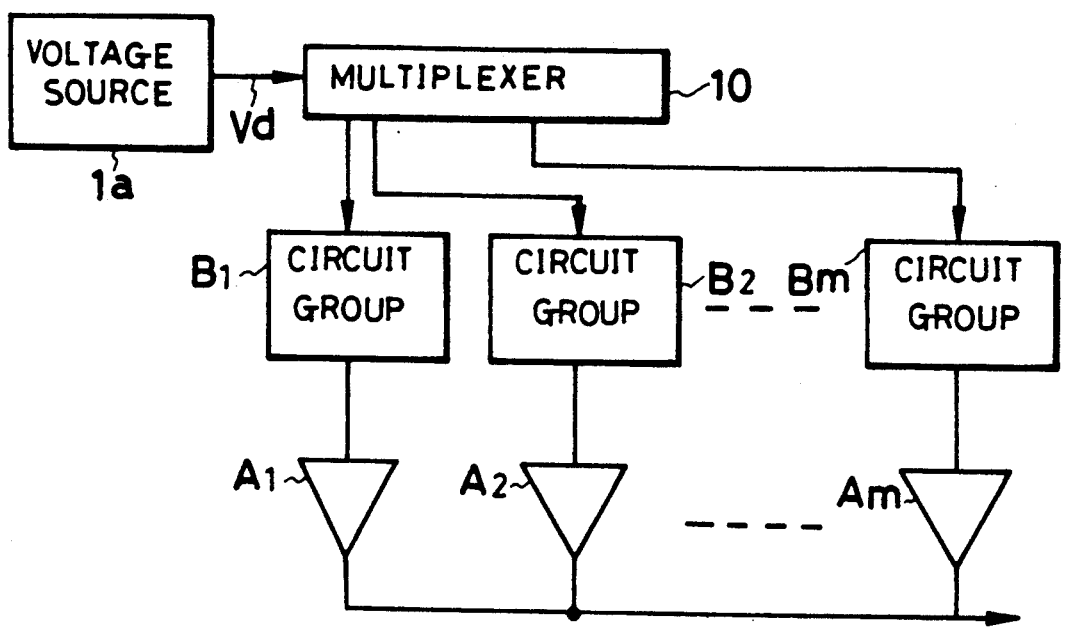
FIG. 11 is a block diagram explanatory of a method of driving the photoelectric converters in the case where a large number of photoelectric converters and diodes are employed.
Figure 12:
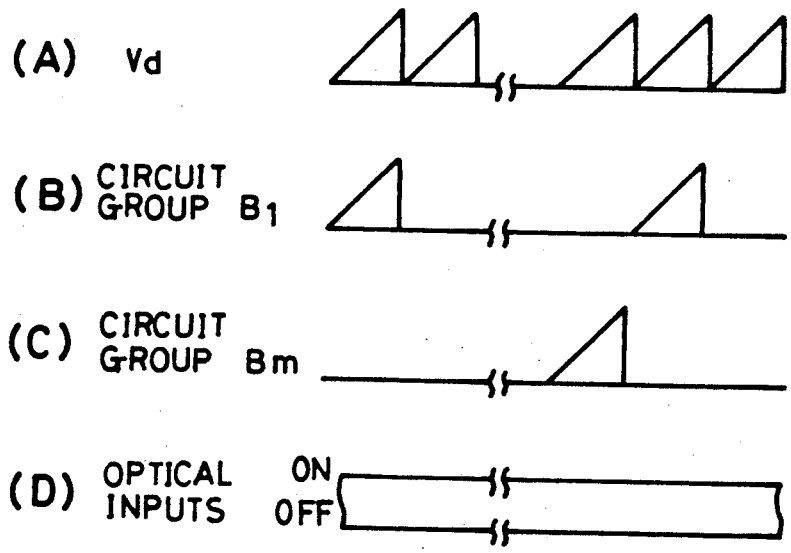
FIG. 12, consisting of (A)-(D), is a series of diagrams explanatory of the operation of the FIG. 11 system.

The image sensor of FIG. 1 requires as many as, say, 2000 unit circuits $K_0$–$K_3$, . . . for use in facsimile. It is therefore apparent that the FIG. 1 circuit requires a very high peak value of the sawtooth voltage for simultaneous conduction of all the diodes $D_{a1}$–$D_{a3}$, . . . and $D_{b0}$–$D_{b3}$, . . . . FIGS. 11 and 12 illustrate one possible method of minimizing the maximum output voltage of the voltage source 1.

In FIG. 11 the n unit circuits are divided into m groups $B_1$, $B_2$, . . . Bm each comprising from several to several tens of unit circuits. The unit circuit groups $B_1$–Bm are connected to a common voltage source 1a via a multiplexer 10. The outputs of the unit circuit groups are interconnected via separate amplifiers $A_1$–Am.

In the operation of the FIG. 11 arrangement the voltage source 1a repeatedly generates the sawtooth wave (triangular wave) shown in FIG. 12(A). The multiplexer 10 operates to distribute this sawtooth wave among the unit circuit groups $B_1$–Bm as shown in FIGS. 12(B) and 12(C). Optical inputs are constantly applied to the photoelectric converters of the unit circuit groups $B_1$–Bm as shown in FIG. 12(D).

Figure 13:
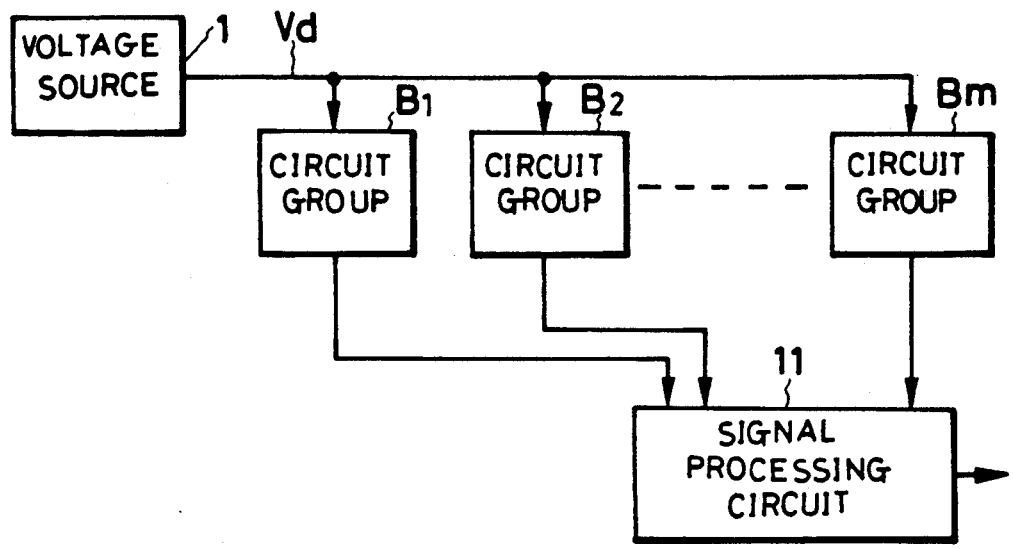
FIG. 13 is a block diagram explanatory of another method of driving the photoelectric converters in the case where a large number of photoelectric converters and diodes are employed.
Figure 14:
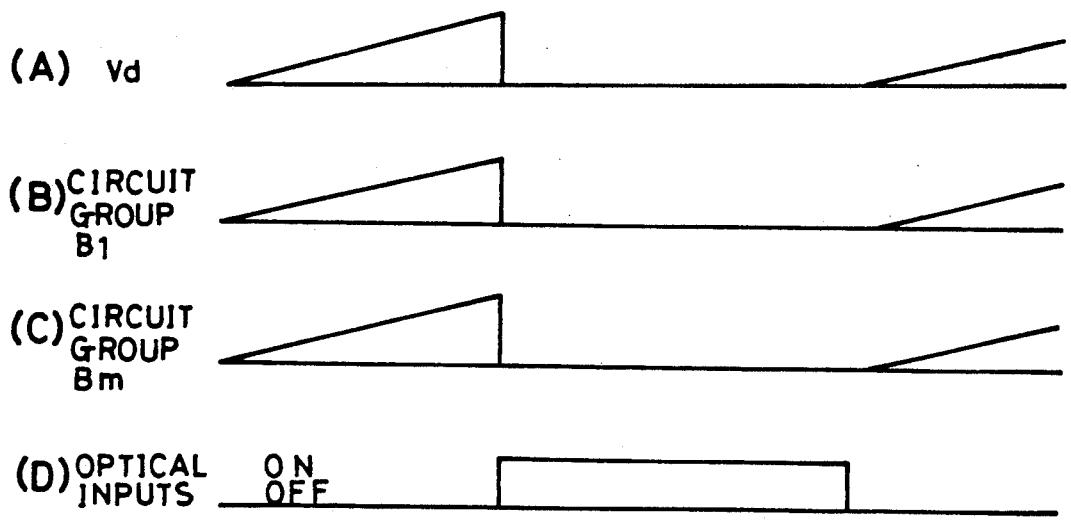
FIG. 14, consisting of (A)-(D), is a series of diagrams explanatory of the operation of the FIG. 13 system.

FIGS. 13 and 14 show another method of driving the image sensor. It will be noted from FIG. 13 that the n unit circuits, similar to the unit circuits $K_0$–$K_3$ of FIG. 1, are divided into m groups $B_1$–Bm as in the FIG. 11 arrangement. The unit circuit groups $B_1$–Bm are all connected to the common voltage source 1 which generates the sawtooth wave shown in FIG. 14(A).

As will be understood from FIGS. 14(B) and 14(C), the sawtooth wave is supplied simultaneously to all the unit circuit groups $B_1$–Bm. Therefore, scanning begins in all these unit circuit groups at the same time, and they produce outputs simultaneously. These outputs are directed to a common signal processing circuit 11 including a memory. The signal processing circuit 11 functions to serially rearrange the outputs from the unit circuit groups $B_1$–Bm, in the order of these unit circuit groups, along a common time axis. Also, in the image sensor of FIG. 13, the optical inputs to the photoelectric converters are supplied only during the zero level periods of the drive voltage Vd, as shown in FIG. 14(D).

The diodes $D_{a1}$–$D_{a3}$ and $D_{b0}$–$D_{b3}$ of the FIG. 1 image sensor may be fabricated from amorphous silicon carbide. Also, these diodes may be pn junction diodes or Schottky diodes instead of pin junction diodes.

In FIG. 1 the voltage source 1, diodes $D_{a1}$–$D_{a3}$ and $D_{b0}$–$D_{b3}$, blocking diodes $D_{c0}$–$D_{c3}$ and photoelectric converters $S_0$–$S_3$ may all be connected with their polarities reversed. Also in FIG. 1 the photoelectric converters $S_0$–$S_3$ may be replaced by other loads or circuit elements.

INDUSTRIAL APPLICABILITY

The scanning circuit according to the invention is suitable for scanning the photoelectric converters of image sensors. Transistors heretofore employed as scanning analog switches have required the provision of wiring conductors with a width of approximately 10 micrometers if the width of each sensor circuit corresponding to one picture element is 125 micrometers. The width of each wiring conductor can be 20 microns or so by employing the diodes of this invention in place of the transistors. Therefore, the present invention is particularly well suited for use as a scanning circuit fabricated in the form of an integrated circuit.

We claim:

1. A scanning circuit device comprising:
    a voltage source (1) for generating a sawtooth wave;
    a first series circuit connected to a first terminal of the voltage source and having a plurality of diodes ($Da_1$-$Da_3$) interconnected in series, each diode having a first and a second electrode, with the first electrode disposed toward the voltage source, the diodes being so oriented as to be forward biased by the sawtooth wave;
    a plurality of second series circuits each having a resistor ($Ra_1$-$Ra_3$) and a diode ($Db_1$-$Db_3$) interconnected in series, the second series circuits being connected one between the second electrode of each diode of the first series circuit and a second terminal of the voltage source, the diodes of the second series circuit being so oriented as to be forward biased by the sawtooth wave;
    a plurality of resistors ($Rb_1$-$Rb_3$) connected one between the second electrode of each diode of the first series circuit and the second terminal of the voltage source; and
    a plurality of scanned circuit elements ($S_1$-$S_3$ or $L_1$-$L_3$) connected substantially in parallel with the respective diodes of the second series circuits.

2. A scanning circuit device as claimed in claim 1, further comprising:
    a third series circuit having a resistor ($Ra_0$) and a diode ($Db_0$) interconnected in series, the third series circuit being connected between the first and second terminals of the voltage source; and
    an additional circuit element to be scanned ($S_0$ or $L_0$) connected substantially in parallel with the diode of the third series circuit.

3. A scanning circuit device as claimed in claim 1 or 2, wherein the sawtooth wave has a ramp portion varying linearly.

4. A scanning circuit device as claimed in claim 1 or 2, wherein the sawtooth wave varies stepwise with time.

5. A scanning circuit device as claimed in claim 1 or 2, wherein the sawtooth wave varies as a two dimensional curve with time.

6. A scanning circuit device as claimed in claim 1, wherein the circuit elements are photoelectric converters ($S_1$-$S_3$).

7. A scanning circuit device as claimed in claim 6, further comprising a blocking diode ($Dc_1$-$Dc_3$) connected in series with each photoelectric converter.

8. A scanning circuit device as claimed in claim 6, further comprising a load resistor (RL) connected in series with all the circuit elements ($S_1$-$S_3$).

9. A scanning circuit device as claimed in claim 6, further comprising a capacitor (CL) connected in series with all the circuit elements ($S_1$-$S_3$).

* * * * *